(12) United States Patent
Kapinos et al.

(10) Patent No.: US 9,672,791 B2
(45) Date of Patent: Jun. 6, 2017

(54) ACTUATION OF DEVICE FOR VIEWING OF FIRST CONTENT FRAMES PRESENTED ON A DISPLAY BETWEEN SECOND CONTENT FRAMES

(71) Applicant: LENOVO (SINGAPORE) PTE. LTD., New Tech Park (SG)

(72) Inventors: Robert James Kapinos, Durham, NC (US); Russell Speight VanBlon, Raleigh, NC (US); Axel Ramirez Flores, Cary, NC (US); Joshua Neil Novak, Wake Forest, NC (US); Jason Grimme, Cary, NC (US); Alfredo Zugasti Hays, Cary, NC (US)

(73) Assignee: Lenovo (Singapore) Pte. Ltd., New Tech Park (SG)

( * ) Notice: Subject to any disclaimer, the term of this patent is extended or adjusted under 35 U.S.C. 154(b) by 137 days.

(21) Appl. No.: 14/596,431

(22) Filed: Jan. 14, 2015

(65) Prior Publication Data

US 2016/0203796 A1    Jul. 14, 2016

(51) Int. Cl.
*G09G 5/14* (2006.01)
*G02B 27/01* (2006.01)
(Continued)

(52) U.S. Cl.
CPC ............ *G09G 5/14* (2013.01); *G02B 27/017* (2013.01); *G09G 5/12* (2013.01); *G02B 2027/0178* (2013.01); *G09G 3/003* (2013.01); *G09G 2354/00* (2013.01); *G09G 2358/00* (2013.01); *G09G 2370/16* (2013.01)

(58) Field of Classification Search
CPC ........... H04N 13/0438; H04N 13/0452; H04N 13/0048; H04N 13/0029; H04N 9/8042; H04N 13/0282; G02B 27/2264; G02B 27/017; G02B 2027/0178; G06F 1/3203; G09G 5/12; G09G 2354/00; G09G 3/003; G09G 2358/00
See application file for complete search history.

(56) References Cited

U.S. PATENT DOCUMENTS 6,188,442 B1 * 2/2001 Narayanaswami    H04N 13/0048
                                                                  345/7
6,658,199 B1 * 12/2003 Hallberg .............. H04N 9/8042
                                                                  386/346

(Continued)

FOREIGN PATENT DOCUMENTS

EP        2765777 A1    8/2014
GB        2470402 A    11/2010

*Primary Examiner* — Nicholas Lee
*Assistant Examiner* — Richard Hong
(74) *Attorney, Agent, or Firm* — John L. Rogitz; John M. Rogitz (57) ABSTRACT

In one aspect, a device includes a processor, at least one lens accessible to the processor, and a memory accessible to the processor. The memory bears instructions executable by the processor to receive synchronization information from another device, and based on the synchronization information, actuate the at least one lens to permit visible light to pass therethrough at times at which first frames of first content are presented and not at times that second frames different from the first frames for second content different from the first content are presented.

21 Claims, 7 Drawing Sheets

(51) Int. Cl.
    *G09G 5/12*    (2006.01)
    *G09G 3/00*    (2006.01)

(56) References Cited

U.S. PATENT DOCUMENTS

| | | | |
|---|---|---|---|
| 8,724,026 B2* | 5/2014 | Macleod | H04N 13/0438 |
| | | | 348/53 |
| 2011/0090233 A1* | 4/2011 | Shahraray | G02B 27/2264 |
| | | | 345/520 |
| 2011/0102561 A1* | 5/2011 | Ichihashi | H04N 13/0438 |
| | | | 348/56 |
| 2012/0023540 A1* | 1/2012 | Meuninck | H04N 13/0282 |
| | | | 725/118 |
| 2012/0092469 A1 | 4/2012 | Kovalick | |
| 2012/0151341 A1* | 6/2012 | Ko | G06F 1/3203 |
| | | | 715/716 |
| 2012/0154553 A1* | 6/2012 | Zustak | H04N 13/0452 |
| | | | 348/51 |
| 2012/0190439 A1* | 7/2012 | Nourbakhsh | G02B 27/2264 |
| | | | 463/31 |
| 2012/0254732 A1 | 10/2012 | Proux et al. | |
| 2013/0063578 A1 | 3/2013 | Uesaka et al. | |
| 2014/0160354 A1* | 6/2014 | Park | H04N 13/0029 |
| | | | 348/564 |

* cited by examiner

ACTUATION OF DEVICE FOR VIEWING OF FIRST CONTENT FRAMES PRESENTED ON A DISPLAY BETWEEN SECOND CONTENT FRAMES

FIELD

The present application relates generally to actuation of a device for viewing of first content frames presented on a display between second content frames.

BACKGROUND

It is often desirable to present two different contents on the same display. However, so-called "picture-in-picture" formatting makes it difficult for a person to view the smaller of the two contents. Also, two different contents can be presented in a split-screen mode, but the resulting aspect ratios for the contents are relatively inadequate. There are currently no adequate solutions for remedying the foregoing.

Furthermore, there may instances where content presented on a display is of a confidential nature and/or a user otherwise wishes to limit the ability of people proximate to the display to view the content presented thereon. There are currently no adequate solutions for preventing unauthorized viewing e.g. in a public area.

SUMMARY

Accordingly, in one aspect a device includes a processor, at least one lens accessible to the processor, and a memory accessible to the processor. The memory bears instructions executable by the processor to receive synchronization information from another device, and based on the synchronization information, actuate the at least one lens to permit visible light to pass therethrough at times at which first frames of first content are presented and not at times that second frames different from the first frames for second content different from the first content are presented.

In another aspect, a method includes exchanging, at a first device, authentication information with a second device different from the first device. The method also includes, based at least in part on successful authentication of the first device based at least in part on the exchanging of authentication information, receiving at the first device from the second device information pertaining to presentation of first content on a display. The method further includes, based at least in part on the information, actuating the first device to enable viewing at a first rate using the first device of the first content presented on a display. The first rate corresponds to a second rate at which first frames of the first content are presented on a display between second frames of second content different from the first content. The first device is actuated to disable viewing of the second frames of the second content presented on a display.

In still another aspect, a device includes a processor, a display accessible to the processor, and a memory accessible to the processor. The memory bears instructions executable by the processor to present, at at least an area of the display, plural frames of first content between respective frames of second content also presented at at least the area, the second content being different from the first content.

The details of present principles, both as to their structure and operation, can best be understood in reference to the accompanying drawings, in which like reference numerals refer to like parts, and in which:

DETAILED DESCRIPTION

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a transitory signal) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A. B. C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Figure 1:
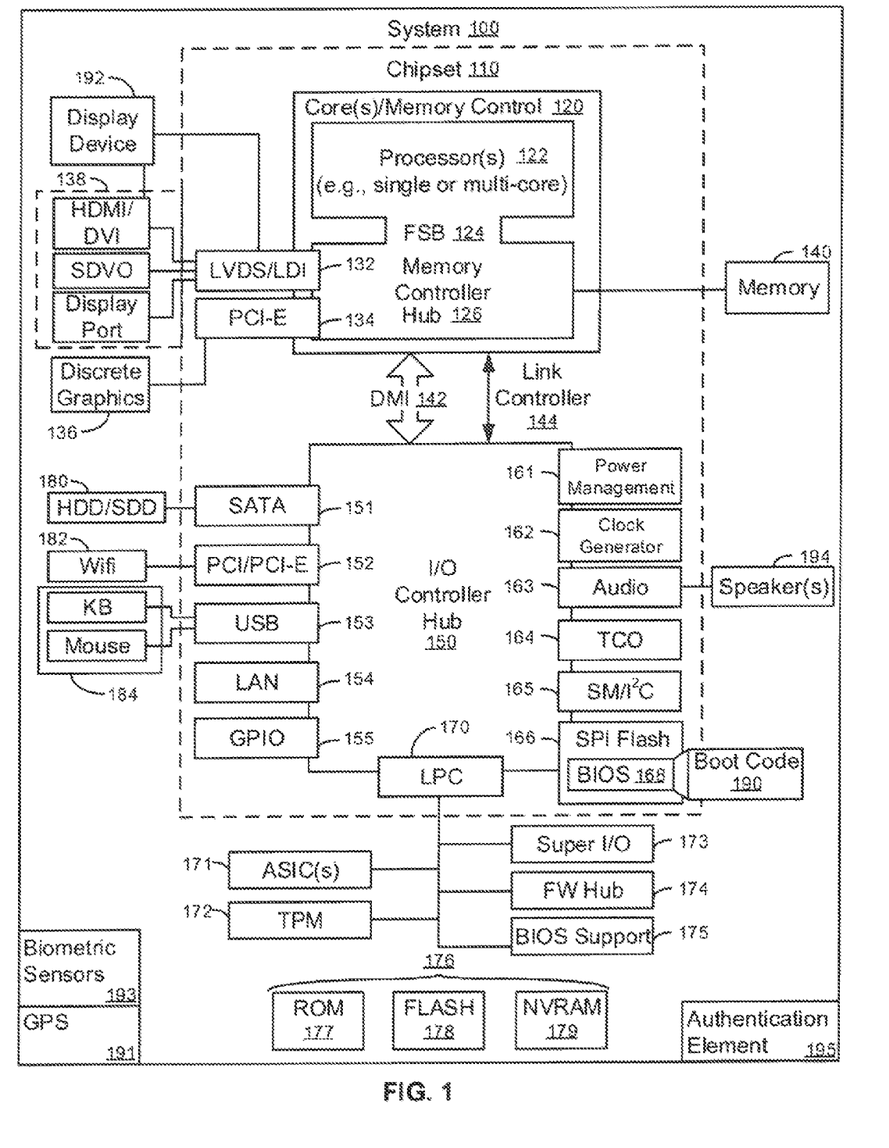
FIG. 1 is a block diagram of an example system in accordance with present principles.

Now specifically in reference to FIG. 1, it shows an example block diagram of an information handling system and/or computer system 100. Note that in some embodiments the system 100 may be a desktop computer system, such as one of the Thinkcentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data signals, commands, etc.) via, for example, a direct management interface or direct media interface (DMI) 142 or a link controller 144. In the example of FIG 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). Still other display busses may be used in accordance with present principles, such as e.g. USB transport, Video Over IP, Wireless Display (e.g. WiDi), and Miracast. The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose 110 interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g.

tangible computer readable storage mediums that may not be transitory signals. The hub controller 150 may also include an advanced host controller interface (AHCI) to support one or more drives 180. The PCI-E interface 152 allows for wireless connections 182 to devices, networks, etc. The USB Interface 153 provides for input devices 184 such as keyboards (KB), mice and various other devices (e.g., cameras, phones, storage, media players. etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, in some embodiments the system 100 may include a GPS transceiver 191 that is configured to e.g. receive geographic position information from at least one satellite and provide the information to the processor 122. However, it is to be understood that another suitable position receiver other than a GPS receiver may be used in accordance with present principles to e.g. determine the location of the system 100.

The system 100 also includes at least one and optionally plural biometric sensors 193, such as e.g. retina sensors and/or fingerprint sensors for sensing one or more biometrics of a user for e.g. authentication of the user by the system 100, such as via retina detection and identification, and/or fingerprint detection and identification. Other types of biometric sensors for authentication of a user in accordance with present principles may include but are not limited to heart rate and/or pattern sensors, brain activity sensors, voice sensors, breath and/or lung output sensors, etc.

In addition, the system 100 may include an authentication element 195 for providing authentication information to another device in accordance with present principles. For example, the authentication element 195 may comprise a near field communication (NFC) element and/or radio frequency identification (RFID) element, as well as e.g. a Bluetooth and/or Bluetooth low energy (BLE) communication element. Also, though now shown for clarity, in some embodiments the system 100 may include a gyroscope for e.g. sensing and/or measuring the orientation of the system 100 and providing input related thereto to the processor 122, an accelerometer for e.g. sensing acceleration and/or movement of the system 100 and providing input related thereto to the processor 122, an audio receiver/microphone providing input to the processor 122 e.g. based on a user providing audible input to the microphone, and a camera for gathering one or more images and providing input related thereto to the processor 122. The camera may be, e.g., a thermal imaging camera, a digital camera such as a webcam, and/or a camera integrated into the system 100 and controllable by the processor 122 to gather pictures/images and/or video.

Figure 2:
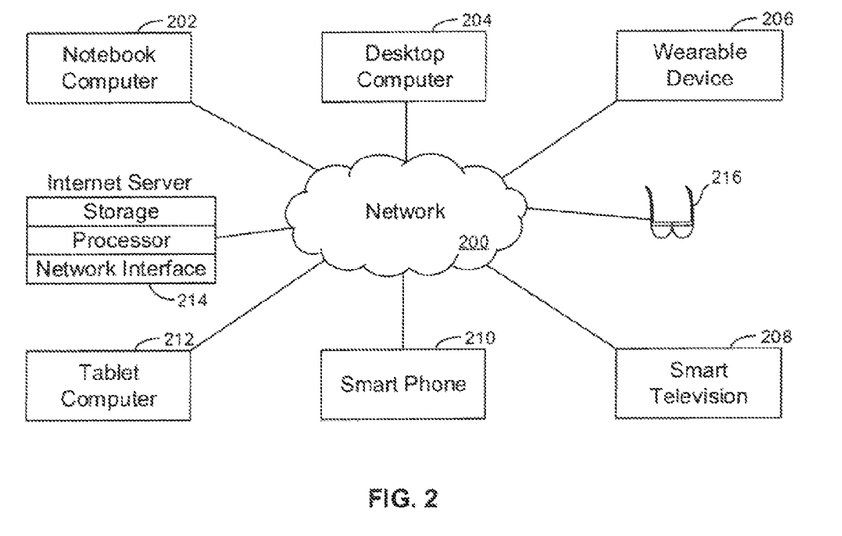
FIG. 2 is a block diagram of a network of devices in accordance with present principles.

Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart, phone 210, a tablet computer 212, electronic glasses 216, and a server 214 in accordance with present principles such as e.g. an Internet server that may e.g. provide cloud storage accessible to the devices 202-212. and 216 and/or facilitate transfer of authentication information between the devices 202-212 and 216. It is to be understood that the devices 202-216 are configured to communicate with each other over the network 200 to undertake present principles.

Figure 3:
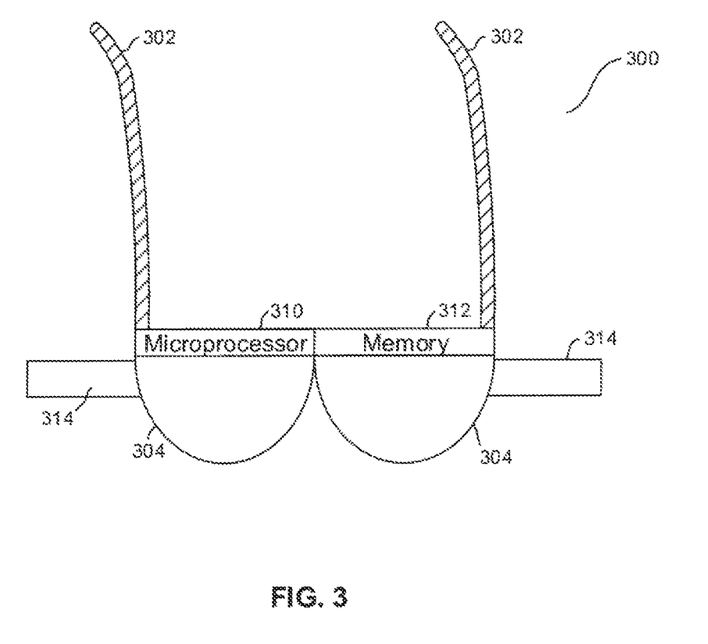
FIG. 3 is a block diagram of example electronic glasses in accordance with present principles.

Referring to FIG. 3, it shows a perspective view of example eye glasses 300 that may be used in accordance with present principles, it being understood that the system 100 may be e.g. embodied in the glasses 300 and accordingly the glasses 300 may include some or all of the elements of the system 100 discussed above. In any case, the glasses 300 include a frame 302 which may comprise elongated arms for positioning over the ears of a person, as well as a center portion between the elongated arms at respective first ends of the arms to connect the arms, and/or engage with and/or couple to one or more lenses and other components of the glasses 300 to be described below.

Thus, the glasses 300 include one or more at least partially transparent lenses 304 through which as user may view objects in the user's line of sight when the glasses 300 are worn on the user's face, such as e.g. video content presented on a display (e.g. a computer display, a television, a screen onto which images from a projector may be projected, etc.). Note that the at least partially transparent lenses 304 are also configured for alternating (e.g. shuttering) between configurations in which they permit at least visible light (e.g. to a human) to pass therethrough and in which they do not permit at least visible light to pass therethrough such as e.g. by transitioning from at least partially transparent to opaque (e.g. with the lenses having at least portions thereof appearing to be blackened). Thus, the lenses 304 may use liquid crystal display (LCD)-based technologies, and/or technologies using so-called smart glass such as e.g. switchable glass, micro-blind glass, photo-chromic glass, electro-chromic glass, and/or thermo-chromic glass.

In addition to the foregoing, the glasses 300 may also include a processor 310 and memory 312 accessible to the processor 310 and storing data such as e.g. instructions executable by the processor 310 to undertake present principles (e.g. instructions storing the logic discussed in reference to FIG. 4 below). As also shown in FIG. 3, the glasses 300 may comprise one or more cameras 314 such as e.g. digital cameras and/or cameras configured and/or oriented for gathering images of at least one and optionally plural of a user's eyes (e.g. and specifically their retinas) when wearing the glasses 300 and/or to track eye movement of the eyes of the user when wearing the glasses. Thus, using retina detection and/or recognition software, the processor 310 may identify a particular user wearing the glasses 300.

Before moving on to the description of FIG. 4, it is to also be understood in reference to the glasses 300 of FIG. 3 that they may comprise a network interface for communication over at least one network such as the Internet, a WAN, a LAN, etc. under direction of the processor(s) 310 with another device such as e.g. a smart phone, laptop computer, tablet computer, display device etc., and furthermore the glasses 300 may comprise e.g. a battery providing power to one or more elements of the glasses 300, where the battery is chargeable through a charge port on the glasses 300 which is in electrical communication with the battery.

Figure 4:
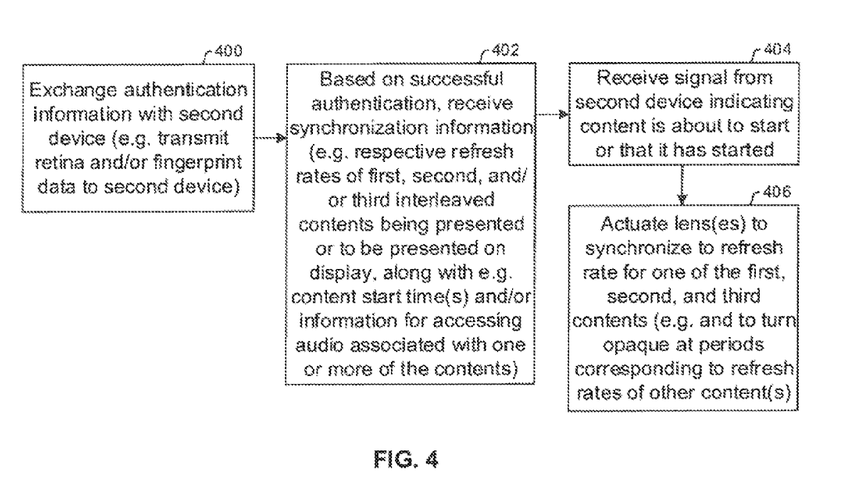
FIGS. 4 and 5 are flow charts showing example algorithms in accordance with present principles.

Now in reference to FIG. 4, it shows example logic that may be undertaken by a device such as the system 100 and/or glasses 300 in accordance with present principles (referred to in reference to FIG. 4 for simplicity as the "present device"). Beginning at block 400, the logic exchanges authentication information with a second device (e.g. over an encrypted communication line) such as e.g. the device which executes the logic of FIG. 5 discussed below and/or a device controlling a display on which plural contents will be presented in accordance with present principles (referred to in reference to FIG. 4 for simplicity as the "display device"). The authentication information that is exchanged at block 400 includes e.g. providing RFID tag data from an RFID tag on the present device to the display device (e.g. based on a "tap" of the present device physically against the display device, providing retina and/or fingerprint data gathered at the present device to the display device, and/or receiving back from the display device corresponding confirmation of authentication and/or specific authentication parameters (e.g. such as information relating to which ratings of content the user from which the retina and/or fingerprint data was gathered is authorized to view, as set forth further below).

From block 400 the logic proceeds to block 402. At block 402 the logic, based on successful authentication of the present device and/or the user from which the retina and/or fingerprint data was gathered based at least on the information exchanged at block 400, receives synchronization information from the display device. The synchronization information may include e.g. information pertaining to respective refresh rates of first, second, and/or third different contents (e.g. audio video (AV) contents such as different movies) that have had their frames interleaved with each other for presentation of the frames in sequence on a display controlled by the display device. The synchronization information may also include e.g. information regarding one or more respective start times for when first (and/or subsequent and/or particular) frames of the respective contents will be presented, when the interleaved frames will begin being presented in sequence from a first frame of all the interleaved frames, and/or an indication that the frames of the interleaved contents have already begun to be presented and when a frame of a particular one of the contents will be presented so that the present device may synchronize itself to the refresh rate for that particular content.

Still further, the synchronization information may include information regarding accessing audio associated with one or more of the contents so that the audio can be provided at the present device, such as speakers of the presented device (and/or at another device within hearing distance to the present device), when synchronized to the presentation of that content so the user may listen to audio associated with that content. For example, information ma be provided at block 400 pertaining to an Internet address or another source of (e.g. streaming) content at which audio corresponding to the particular content to be viewed may be accessed. Other examples include information pertaining to a radio frequency (e.g. AM, FM, or XM) to which to tune to access such audio (e.g. where the audio may be broadcast over a radio frequency from the display device itself), a Bluetooth frequency to which to tune to access such audio (e.g. where the audio may be broadcast over a Bluetooth frequency from the display device itself), a television channel to which to tune to access such audio, etc.

Still in reference to FIG. 4, after block 402 the logic proceeds to block 404. At block 404 the logic optionally receives (e.g. over an encrypted communication line) at least one signal from the display device indicating that content is about to start or has already started. For example, the at least one signal may be received at block 404 if information contained in the at least one signal was not already received at block 402 such as when e.g. the refresh rate for a particular content interleaved with other content may be identified and provided at block 402 but a user has not yet (at the time of execution of block 402) provided a command to begin presenting the interleaved frames of the plural contents on the display, or at least the frames of the particular content the user wishes to view using the present device.

In any case, after block 404 the logic moves to block 406. At block 406 the logic actuates one or more lenses of the present device (e.g. of glasses) to synchronize to the refresh rate of one of the contents that have had their frames interleaved with the other respective contents. Synchronization may include e.g. permitting visible light to pass through the lens(es) at times corresponding to presentation of the frames of the respective content to be viewed based on e.g. the refresh rate of the respective content and an indication of when one (e.g. a first) of the frames for that particular content will be presented (e.g. as received at the present device at block 402). Further, during periods in which interleaved frames of the other respective contents are presented, the lens(es) may be actuated to turn opaque (e.g. black) so that little to no visible light passes therethrough, and thus the user when perceiving the particular content presented on the display through the lens(es) will not see interleaved frames associated with other respective contents than the one to which the present device is synchronized.

Figure 5:
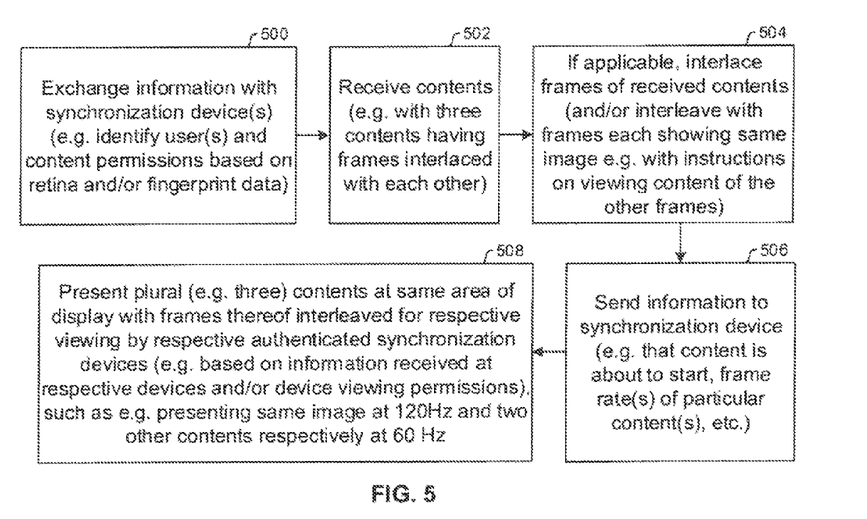

Continuing the detailed description in reference to FIG. 5, it shows example logic that may be undertaken by a device such as the system 100 and/or the display device mentioned above in reference to FIG. 4 (referred to in reference to FIG. 5 for simplicity as the "display device"). Beginning at block 500, the logic exchanges authentication information with at least a second device (e.g. over an encrypted communication line) such as e.g. the device which executes the logic of FIG. 4 and/or glasses such as the glasses 300 described above (referred to in reference to FIG. 5 for simplicity as the "sync device"). The information that is exchanged may include receiving identifying information for the sync device and/or a user associated with the sync device (e.g. biometric information) and providing back to the sync device information pertaining to whether the sync device and/or user have been authenticated as being authorized to view content requested by the sync device (e.g. as indicated with the authentication information received from the sync device) and/or presented on a display controlled by the display device. The authentication information received by the display device from the sync device may be used to identity e.g. permissions associated with the sync device and/or the user thereof (e.g. such as may be identified using the data table 800 of FIG. 8 to be described below), such as e.g. authorization to view particular contents using the sync device, authorization view contents of one or more ratings and/or access levels using the sync device, etc.

Regardless, from block 500 the logic proceeds to block 502. At block 502 the logic receives and/or accesses at least one content from a content source, such as e.g. receiving a single stream of content comprised of respective frames of separate contents that have been interleaved with each other prior to receipt by the display device at block 502. From block 502, the logic moves to block 504 where, e.g. if at block 502 the logic received and/or accessed the different contents separately from each other (e.g. not with frames thereof already interleaved), the logic may at the display device itself interleave frames of the respective contents it has received and/or accessed for presentation on the display (e.g. based on execution of time-division multiplexing). Also at block 504, the logic may interleave with the content received and/or accessed at block 502 frames each showing one or more same or similar images for viewing by a person with their naked eye and not the sync device (e.g. such as instructions on how to view content that cannot be seen save for using the sync device). Such images will be described further below.

Still in reference to FIG. 5, from block 504 the logic proceeds to block 506. At block 506 the logic sends information to the sync device regarding presentation of one or more contents that have had their respective frames interleaved with each other for presentation on the display. E.g., the information that may be transmitted to the sync device at block 506 may include at least some of the information discussed above in reference to blocks 402 and 404 as being received by the logic of FIG. 4 thereat. After block 506 the logic then moves to block 508, where the logic presents plural (e.g. three) contents on a same area of the display (e.g. on the entire area of the display on which images are presentable) with frames of the respective contents interleaved (e.g. for respective viewing by one or more authenticated sync devices) using e.g. different refresh rates and presentation times so that e.g. no two frames for different contents are presented concurrently but instead frames of respective contents are presented in sequence based on their interleaving.

Thus, e.g. the authenticated sync devices may be actuated to allow perception through lenses thereof of one of the respective contents presented at block 508 based on respective permissions for the sync devices identified at block 500 and/or information provided by the display device at e.g. block 506. In one example embodiment, an same image for which frames thereof have been interleaved between frames of other content may be presented on the display at a refresh rate for one hundred twenty Hertz (Hz) for perception by a human when looking, at the display and without the aid of the sync device, while frames of two other contents may be interleaved between frames of the other respective content and the same image at a refresh rate of sixty Hz each for perception by a person when looking through lenses of the sync device.

Figure 6:
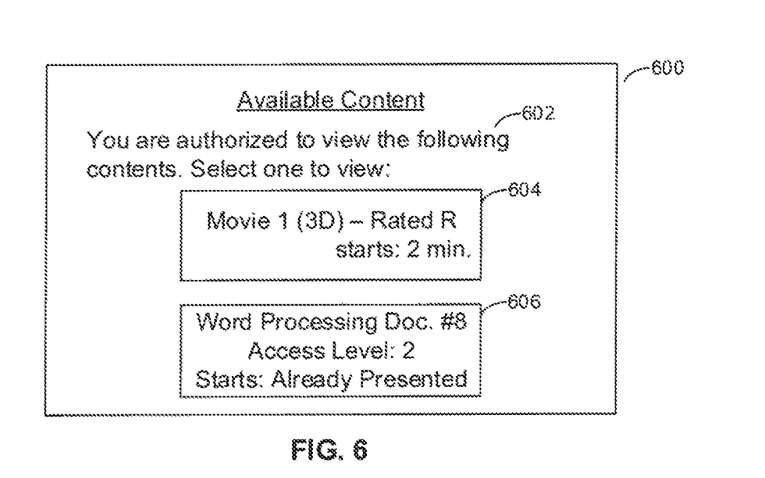
FIGS. 6 and 7 show example user interfaces (UIs) in accordance with present principles.

Moving on, reference is now made to FIG. 6, which shows an example user interface (UI) 600 presentable on a device such as e.g. the device undertaking the logic of FIG. 4 (e.g. a "heads-up" display on the at least partially transparent lens) and/or the device undertaking the logic of FIG. 5. In any case, the UI 600 includes an indication 602 that a user, and/or a sync device itself, is authorized to view at least one content (e.g. based on authentication as discussed herein). The UI 600 also includes at least one and optionally plural selector elements 604 and 606 respectively associated with different contents (e.g. word processing documents, AV content, pictures, etc.) the user and/or device is authorized to view.

It may be appreciated from FIG. 6 that the elements 604 and 606 respectively indicate identifying information for the respective contents with which they are associated, such as e.g. a description of the respective content, a title and/or file name of the respective content, whether the content is two-dimensional content or three-dimensional (3D) content, the rating of the content (e.g. television and/or motion picture ratings), an (e.g. minimum) access level required to view the content, the total run time and/or length of the content, and/or a time at which the content is or will begin being presented. Furthermore, note that each of the elements 604 and 606 are respectively selectable to automatically without further user input to cause a sync device to be actuated (e.g. based on commands transmitted thereto and/or generated thereat) to permit visible light to pass through one or more lenses thereof at a refresh rate and times corresponding to presentation of frames on a display of the content associated with the selected one of the elements 604 and 606.

Figure 7:
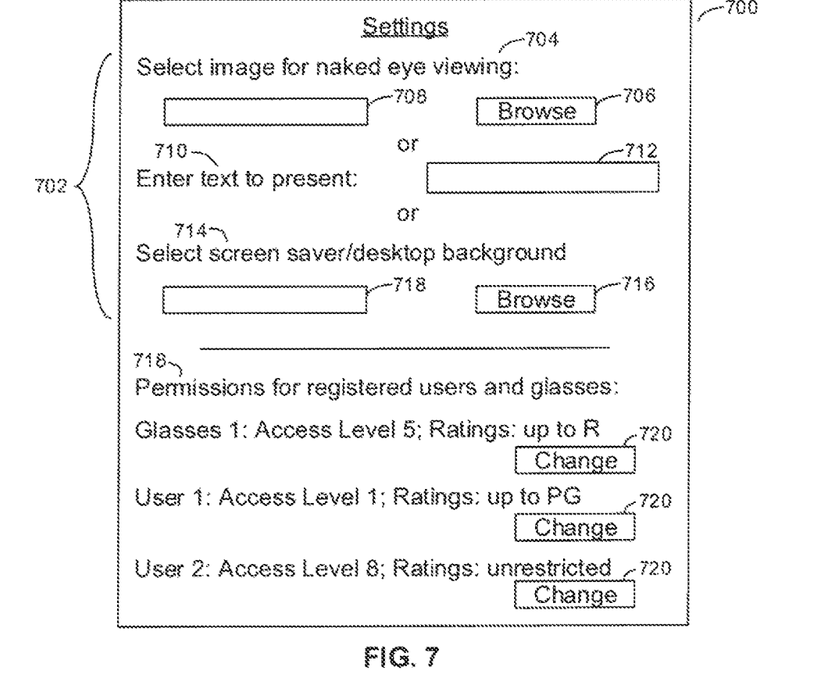

Now in reference to FIG. 7, it shows an example settings UI 700 that may be presented on a device such as e.g. the device undertaking the logic of FIG. 4 and/or the device undertaking the logic of FIG. 5 for configuring settings of one or more applications undertaking present principles. The UI 700 includes a first setting 702 pertaining to selecting an image, text, screen saver, desktop background, etc. for viewing when presented on a display with a user's naked eye(s) and without the aid of another device such as the glasses described above in accordance with present principles. Thus, it is to be understood that in non-limiting embodiments, whatever is selected using the setting 702 (referred to in reference to FIG. 7 for simplicity as first content) will be presented in frames having, a refresh rate relatively higher than the refresh rate of presentation of other contents perceptible to a human using the glasses (referred to in reference to FIG. 7 for simplicity as second content).

In any case, it may be appreciated from FIG. 7 that the setting 702 includes a first area 704 for, using e.g. a browse button. 706 and/or image entry box 708, selecting, indicating and/or configuring a display device to present the same image selected by a user using the elements 706 and 708 in each frame of the first content. The setting 702 also includes a second area 710 where a user may, using text entry box 712 and e.g. a virtual and/or "soft" keyboard, enter text to be used by the device to generate the same image that will establish the first content. Still further, the setting 702 includes it third area 714 for, using e.g. a browse button 716 and/or screen saver/desktop background image entry box 718, selecting, indicating and/or configuring the display device to present e.g. a single desktop background or a screen saver selected by a user using the elements 716 and 718 in frames of the first content. For example (and in some embodiments e.g. by default without user configuration using the UI 700), the screen saver and/or desktop image to be presented as the first content may be the default and/or already established screen saver and/or desktop image for the display device controlling the display on which the first content is to be presented.

Still describing FIG. 7, the UI 700 also includes another setting 718 listing respective permissions (e.g. permitted viewing of content of various ratings, access levels, particular content, etc.) for various devices and/or users. Note that as shown, the devices and/or users indicated in the respective permissions have their associated permissions indicated next to them. Also note that each of the devices and/or users indicated in the listing have respective change selector elements 720 presented respectively proximate to them for selection by a user to change one or more permissions associated with the respective device and/or user (e.g. using another UI which may be presented in response to selection of the element 720 for adjusting and/or altering such permissions e.g. by increasing or decreasing access levels and ratings of content permitted to be viewed by the respective user and/or using the respective device).

Figure 8:
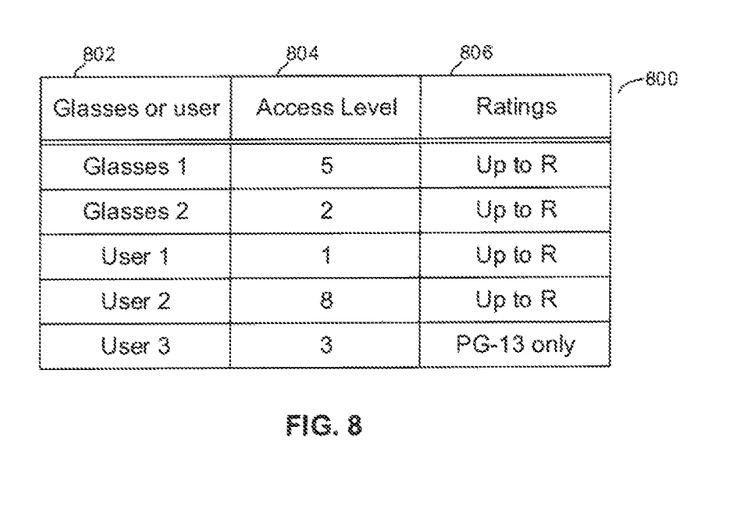
FIG. 8 shows an example data table in accordance with present principles.

Before moving on to the description of FIG. 8, it is to be understood that still other settings may be configured using a UI such as the UI 700 although not specifically shown in FIG. 7. For instance, a setting for a user to configure the total number of contents (e.g. twelve) that may have their frames interleaved for presentation on the same area of a display may be provided, a setting for a user to configure a maximum and/or minimum frame rate for content viewable using the glasses may be provided, one or more settings for a user to configure one or more methods of user and/or device authentication and/or calibration thereof may be provided (e.g. retina, fingerprint, voice, etc.), etc.

Continuing the detailed description in reference to FIG. 8, an example data table 800 is shown which may be stored at and/or accessed by a device such as the display device disclosed above in reference to FIG. 5 and/or a device such as the glasses 300 for identifying and/or determining permissions for viewing content (e.g., using the glasses 300) that are associated with a particular user and/or device in accordance with present principles. Thus, e.g. the logic of FIG. 5 may at block 500 access the table 800 to upon receipt of user and/or device identity and/or authentication information determine which content of certain access levels and/or content of certain ratings is permitted for perception by a user using the device.

Accordingly, a device such as the display device of FIG. 5 and/or glasses may receive identifying and/or authentication information of the user and/or device and access the data table 800. The device may then parse data in column 802 of the table 800 until a particular device and/or user is identified from the column 802 as being a match to the user and/or device identified from the received information. Once a user and/or device is identified from an entry in the column 802 as being a match to the user and/or device from the received information, where the entry corresponds to a particular row in the table 800, the logic may proceed to either or both of columns 804 and 806 to respectively identify access levels and/or ratings indicated in the particular row for the entry to apply to the user and/or device.

Before moving on in the detailed description, it is to be understood that although not shown, in sonic embodiments the table 800 may include a column listing particular pieces of content permitted for viewing by the use and/or device indicated in a respective row of the column 802.

Figure 9:
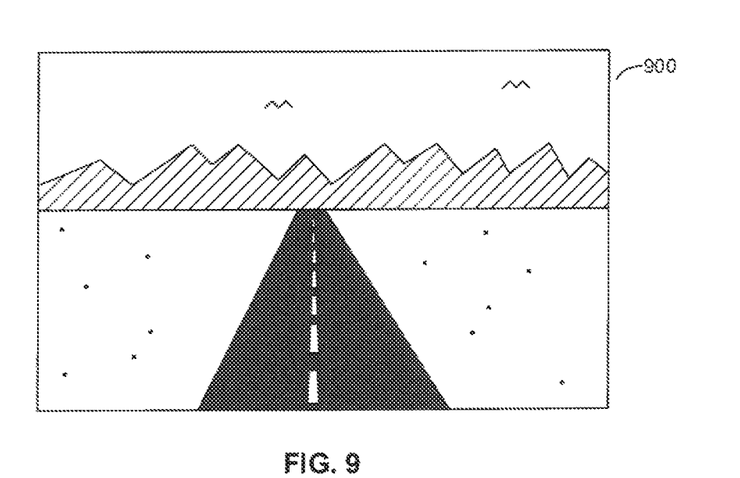
FIGS. 9-11 show example images presentable on a display in accordance with present principles.
Figure 10:
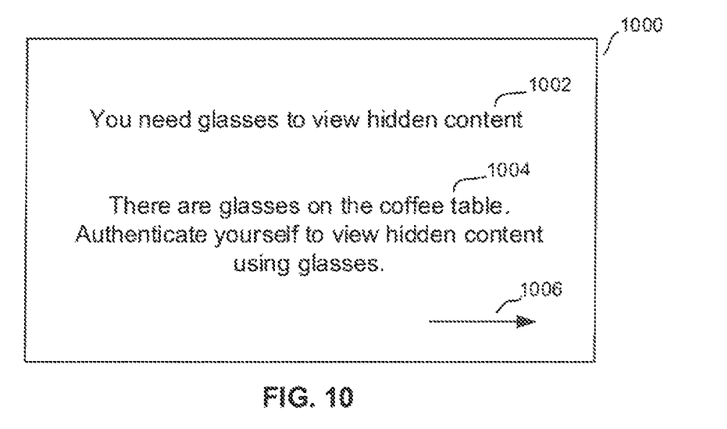
Figure 11:
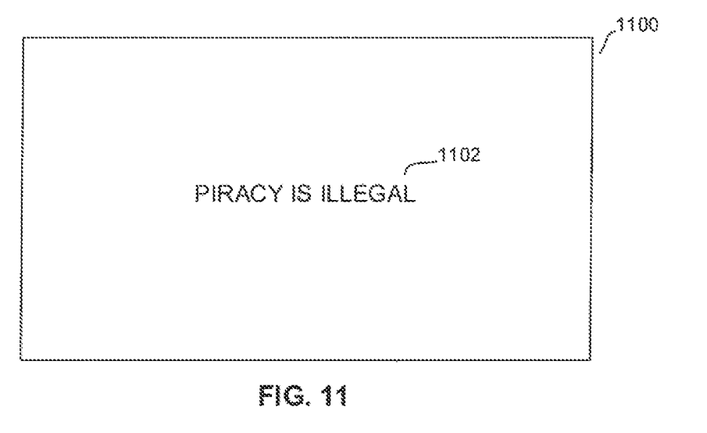

Now in reference to FIGS. 9-11, these figures show respective images that may appear static and/or unmoving to a user when the user looks at them as presented on the display with their naked eye and/or without the aid of e.g. the electronic glasses described herein. The images of FIGS. 9-11 are understood to thus be images presented in frames interleaved between frames of other content, where the frames of the images of FIGS. 9-11 are understood to be presented at a relatively faster refresh rate than the refresh rate of presentation of frames of the other content(s) so that the "static" images are perceptible to a human without the glasses 300 while the frames of the other content are perceptible to a human when using glasses which permit light to pass through their lenses at rates and times corresponding to presentation of the frames of the other content in accordance with present principles.

FIG. 9 shows a landscape image 900 that may have been selected by a user e.g. using the UI 700 described above. FIG. 10 shows an image 1000 indicating that electronic glasses are needed to view "hidden" content, the content being "hidden" in that frames of content interleaved with frames showing the image 1000 cannot be viewed with the naked eye unaided by the glasses described herein. The image 1000 also includes instructions 1004 on how the user can view the "hidden" content, in this case by obtaining a pair of electronic glasses on a nearby coffee table and authenticating himself or herself. Note that an arrow 1006 is also presented, which may be genera ed by the display device and included in the image 1000 based on the location of the glasses to thus indicate the direction of the glasses relative to the front of the display presenting the image 1000.

Thus, note that in some embodiments, the device controlling the display presenting the image 1000 may be in communication with one or more glasses (e.g. over the Internet, using Bluetooth communication, etc.) to thus obtain from the glasses data pertaining to the location of the glasses as may have been provided by the glasses based on e.g. actuation of a GPS transceiver on the glasses to identify its location. In addition to or in lieu of using a GPS receiver, a camera e.g. on the display and/or in communication with the display device may be actuated to gather images of its surroundings and execute object recognition software on the images to identify the glasses and/or their location (e.g. identifying the glasses and identifying the coffee table as being an object on which the glasses are disposed).

Last, FIG. 11 shows an image 1100 with an indication 1102 that content piracy is illegal. Thus, in one embodiment the image 1000 may be included in frames e.g. interleaved between frames of a 3D motion picture presented on a projector display of a movie theater so that upon entering the theater, users may be provided with glasses for viewing the 3D motion picture but a user not wearing the glasses when trying to view the 3D motion picture and/or viewing a pirated version of the 3D motion picture as recorded in the theater using a video camera would not see the frames of the 3D motion picture without the glasses provided by the theater (e.g. which were synchronized to the refresh rate and/or presentation times of the frames of the 3D motion picture) and instead only be able to perceive the message "piracy is illegal."

Though now shown in FIGS. 9-11, note that in some embodiments rather than e.g. instructions on viewing "hidden" content and/or messages about piracy being illegal, e.g. advertisement images may instead be used. For example, an image showing a soft drink advertisement may be used so that a user with their naked eye unaided by the glasses would see the advertisement. Further, in some embodiments, such a "static" image may be nothing more than a blank (e.g. black) screen with no text or distinguishable images contained therein.

Without reference to any particular figure, it is to be understood that in some embodiments, a pair of electronic glasses configured for undertaking present principles may have at least one button thereon (such as e.g. on an arm of the frame of the glasses) for e.g. instances where the glasses and/or user associated therewith has been verified as permitted to watch more plural contents using the glasses which have had their respective frames interleaved with e.g. a static image as described above. In such instances, a user may select the button on the glasses (and/or otherwise issue a corresponding command such as e.g. using voice input) for the glasses to change their operation from allowing perception of a first of the "hidden" contents to allowing perception of a second of the "hidden" contents so that a user can switch and/or toggle back and forth as desired using the glasses between perception of two "hidden" contents. Thus, note that the providing of respective audio corresponding to each of the first and second "hidden" contents by the glasses, if audio is available, may also be switched back and forth as the respective contents are switched back and forth for perception.

Also without reference to any particular figure, it is to be understood that, a device with at least one partially transparent lens that is configured for undertaking present principles need not necessarily permit light to pass through its lens at a fixed and/or constant rate corresponding to a refresh rate of particular content to be viewed using the device, but that in addition to or in lieu of that, the device may permit light to pass through its lens at a variable and/or changing rate that is nonetheless still synchronized with presentation of various and/or individual ones of the frames of the particular content to be viewed using the device. Thus, it is to be understood that in some embodiments, a device undertaking present principles may receive synchronization information in accordance with present principles that contains information pertaining to the individual and/or specific times of presentation of individual frames of the content (e.g. in addition to or in lieu of receiving information pertaining to a (e.g. fixed) refresh rate for presentation of the content).

Still without reference to any particular figure, it is to be understood that during times in which no frames of content to be viewed using glasses as described herein are presented on a display, the lens(es) of the glasses may be actuated to permit light to pass therethrough (e.g. at all times) to thus view content presented on the display that is also viewable with the naked eye. Thus, e.g. before and after presentation of "hidden" content viewable using the glasses (e.g. before the start of a movie and after it concludes), the glasses may be actuated for the "naked eye"content to be viewed using the glasses.

Furthermore, in some embodiments a device (e.g. glasses) undertaking present principles need not necessarily receive synchronization data from another device pertaining to a refresh rate of "hidden content" interleaved between frames of content viewable without the glasses, but that e.g. a camera on the glasses themselves may gather images of any and/or all content (e.g. or at least a sampling presented over a threshold amount of time) presented on the display (e.g. during a given time) and the glasses may parse data (e.g. the images) received from the camera to identify (e.g. using content recognition software) which frames that are presented are associated with a "hidden" first piece of content and which frames that are presented are associated with a second piece of content, and to accordingly also identify a refresh rate that corresponds to presentation of the frames of the first piece of content to thus permit viewing of the first piece of content using the glasses while not permitting viewing of the second piece of content. Still further, in some embodiments a rate for synchronization of the lens(es) with a refresh rate of "hidden" content may already be known to the glasses, and/or provided by a third device that communicates with the glasses but does not necessarily command the display and/or control presentation of content thereon (e.g. an Internet server).

It may now be appreciated that present principles provide for, in one embodiment, e.g. the interleaving of N unsynchronized video streams into one for presentation on a 3D display screen, as well as an encrypted handshake between active 3D glasses and the 3D display to prevent intrusion.

Thus, a user without the 3D glasses would see "naked eye" content while with the 3D glasses the user would see their corresponding encrypted content. When viewing the 3D display without the 3D glasses, the user would thus see a static or moving image unrelated to the 3D video content, whereas with the 3D glasses the user would be able to see the 3D content which has been paired with the glasses.

Moreover, it is to be understood that in some embodiments, more than one "hidden" video source may be coupled to the stream of frames presented on the 3D display (up to e.g. twelve sources) e.g. depending on the content displaying capabilities of a particular display. But in any case, it is to be understood that in example embodiments, the "naked eye" content has more respective frames thereof presented than any one of the "hidden" contents so that a user unaided by the electronic glasses disclosed herein may not be able to perceive the "hidden" content (e.g. other than possibly noticing some imperceptible and/or unidentifiable flicker or subliminal effect).

3D content itself which is to be "hidden" in a content stream relative to naked eye viewing may be embedded in the received content stream itself, and/or may be generated at the display device and inserted into blank spaces of the 3D content stream. Also, in some embodiments the inserted image(s) may contain information informing a user without glasses that they need glasses to view the content, may inform a user without glasses that there are glasses nearby not currently being used by some one else which may be used by the user to view "hidden" content, may inform the user that there are currently no glasses available for use to view "hidden" content, may inform a user of the current and/or real-time location of different particular glasses which may be used to view different "hidden" contents presented on the display, may inform the user that piracy of the content to be pirated is illegal, may contain an advertisement, etc.

Additionally, it is to be understood that glasses in accordance with present principles may include sensors and/or software for recognizing authorized users, thus providing a multi-factor authentication in some embodiments, along with master and/or administrative access controls for configuring which glasses and/or users can view which content. E.g. a pair of glasses may sense a user automatically and/or dynamically, and/or the user may be required to manually authenticate themselves to view certain content (e.g. filtered by access level to secure documents, filtered by content rating, etc.).

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a transitory signal and/or a signal per se.

While the particular ACTUATION OF DEVICE FOR VIEWING OF FIRST CONTENT FRAMES PRESENTED ON A DISPLAY BETWEEN SECOND CONTENT FRAMES is herein shown and described in detail, it is to be understood that the subject matter which is encompassed the present application is limited only by the claims.

What is claimed is:

1. A device, comprising:
a processor;
at least one lens accessible to the processor;

at least one camera accessible to the processor; and
storage accessible to the processor and bearing instructions executable by the processor to:
receive input from the camera;
identify, based on input from the camera, at least a first rate at which first frames of first content are presented on a display that is separate from the device, the first content being different from second content presented on the display between the first frames of the first content; and
actuate, based at least in part on the identification of the first rate, the at least one lens to enable viewing, at the first rate and using the device, of the first content as presented on the display and to disable viewing of second frames of the second content as presented on the display.

2. The device of claim 1, wherein the instructions are executable to:
actuate the at least one lens to synchronize a rate at which the at least one lens permits visible light to pass therethrough with the first rate.

3. The device of claim 2, wherein the instructions are executable to:
actuate the at least one lens to synchronize a rate at which the at least one lens does not permit visible light to pass therethrough with a second rate at which the second frames are presented.

4. The device of claim 3, wherein the second rate renders the second content, but not the first content, perceptible to a human without the aid of the device, and wherein the first rate renders the first content perceptible to a human using the device.

5. The device of claim 4, wherein the second rate is higher than the first rate.

6. The device of claim 3, wherein the first rate and the second rate respectively render the first content and the second content perceptible to a human using the device while respectively presented between third frames of third content different from the first content and the second content, the third content being perceptible to a human without the aid of the device.

7. The device of claim 2, wherein the at least one lens is actuated to synchronize the rate at which the at least one lens permits visible light to pass therethrough with the first rate based at least in part on actuation of the at least one lens to not permit visible light to pass therethrough during presentation of second frames of the second content presented between first frames of the first content.

8. The device of claim 1, wherein the instructions are executable by the processor to:
identify information pertaining to times at which the first content will be presented.

9. The device of claim 1, wherein the instructions are executable by the processor to:
enable selection, by a user of the device and via a user interface (UI), of a static image for presentation at times different from when the first and second frames are presented.

10. The device of claim 1, wherein the instructions are executable by the processor to:
enable selection, by a user of the device and via a user interface (UI), of a screen saver for presentation at times different from when the first and second frames are presented.

11. The device of claim 1, comprising a button, and wherein the instructions are executable by the processor to:
responsive to selection of the button, switch from actuation of the at least one lens to permit visible light to pass therethrough at times at which the first frames of the first content are presented to actuation of the at least one lens to permit visible light to pass therethrough at times at which the second frames of the second content are presented.

12. The device of claim 1, wherein the instructions are executable by the processor to:
identify, based on input from the camera, that the first frames are associated with the first content and that the second frames are associated with the second content; and
identify, based on input from the camera and based on the identification that the first frames are associated with the first content, at least the first rate.

13. A method, comprising:
receiving, at a first device, input from a camera on the first device;
identifying, based on input from the camera, at least a first rate at which first frames of first content are presented on a display that is separate from the first device, the first content being different from second content presented on the display between the first frames of the first content; and
actuating, based at least in part on the identification of the first rate, the first device to enable viewing, at the first rate and using the first device, of the first content as presented on the display and to disable viewing of second frames of the second content as presented on the display.

14. The method of claim 13, wherein the first device is actuated to disable viewing of the second frames at least in part based on actuation of the first device to deny visible light to pass through at least one lens portion of the first device during presentation of the second frames on the display.

15. The method of claim 13, comprising:
identifying, based on input from the camera, that the first frames are associated with the first content and that the second frames are associated with the second content; and
identifying, based on input from the camera and based on the identifying that the first frames are associated with the first content, at least the first rate.

16. The method of claim 13, comprising:
actuating the first device to enable viewing of the first content as presented on the display at least in part by controlling at least one lens on the first device to permit visible light to pass through the at least one lens at a third rate synchronized with the first rate.

17. The method of claim 16, comprising:
actuating the first device to disable viewing, using the first device, of the second content as presented on the display at least in part by controlling the at least one lens to not permit visible light to pass through the at least one lens as synchronized with a second rate for presentation of the second content on the display.

18. A computer readable storage medium (CRSM) that is not a transitory signal, the CRSM, comprising
instructions executable by a processor to:
receive, at a first device, input from a camera on the first device;
identify, based on input from the camera, at least a first rate at which first frames of first content are presented on a display that is separate from the first device, the first content being different from second content presented on the display between the first frames of the first content; and actuate, based at least in part on the identification of the first rate, the first device to enable viewing, at the first rate and using the first device, of the first content as presented on the display and to disable viewing of second frames of the second content as presented on the display.

19. The CRSM of claim 18, wherein the instructions are executable by the processor to:

actuate the first device to disable viewing of the second frames at least in part based on actuation of the first device to deny visible light to pass through at least one lens portion of the first device during presentation of the second frames on the display.

20. The CRSM of claim 18, wherein the instructions are executable by the processor to:

identify, based on input from the camera, that the first frames are associated with the first content and that the second frames are associated with the second content; and identify, based on input from the camera and based on the identifying that the first frames are associated with the first content, at least the first rate.

21. The CRSM of claim 18, wherein the instructions are executable by the processor to:

actuate the first device to enable viewing of the first content as presented on the display at least in part by controlling at least one lens on the first device to permit light to pass through the at least one lens at a third rate synchronized with the first rate.

* * * * *